United States Patent
Hale

(10) Patent No.: US 10,380,810 B2
(45) Date of Patent: Aug. 13, 2019

(54) DIAGNOSTIC METHOD, SYSTEM AND DEVICE FOR A ROTORCRAFT DRIVE SYSTEM

(71) Applicant: Bell Helicopter Textron Inc., Fort Worth, TX (US)

(72) Inventor: Rodney Keith Hale, Joshua, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 252 days.

(21) Appl. No.: 15/677,506

(22) Filed: Aug. 15, 2017

(65) Prior Publication Data
US 2018/0053358 A1 Feb. 22, 2018

Related U.S. Application Data

(60) Provisional application No. 62/376,121, filed on Aug. 17, 2016.

(51) Int. Cl.
| G07C 5/08 | (2006.01) |
| B64C 27/00 | (2006.01) |
| B64C 27/12 | (2006.01) |
| B64F 5/60 | (2017.01) |
| B64D 45/00 | (2006.01) |

(52) U.S. Cl.
CPC .......... *G07C 5/0808* (2013.01); *B64C 27/006* (2013.01); *B64C 27/12* (2013.01); *B64F 5/60* (2017.01); *B64D 2045/0085* (2013.01)

(58) Field of Classification Search
None
See application file for complete search history.

(56) References Cited

U.S. PATENT DOCUMENTS

| 7,224,807 B2 | 5/2007 | Welsh et al. |
| 7,930,111 B2 | 4/2011 | Luo et al. |
| 8,131,420 B2 | 3/2012 | Lynch et al. |
| 8,442,778 B2 | 5/2013 | Bechhoefer et al. |
| 8,930,166 B1 | 1/2015 | Das et al. |

(Continued)

FOREIGN PATENT DOCUMENTS

| CN | 102426102 B | 7/2013 |
| EP | 0889313 A2 | 1/1999 |

(Continued)

OTHER PUBLICATIONS

Sharma, et al.; A review of gear fault diagnosis using various condition indicators; Procedia Engineering 144 (2016) 253-263.

(Continued)

*Primary Examiner* — Shelley Chen
(74) *Attorney, Agent, or Firm* — Timmer Law Group, PLLC

(57) ABSTRACT

A method, system, and device for diagnosing an anomaly of a monitored component in a drive train, the method including obtaining rotational information associated with the component; receiving original data indicating the toothmesh frequency of the drive train; filtering the original data to remove energy above the toothmesh frequency; interpolating the filtered original data to generate an integer number of samples per tooth passage; and generating an amplified differential coherence (ADC). In some embodiments, an amplified differential coherence gearbox arrangement value (ADCT) is generated.

20 Claims, 11 Drawing Sheets

(56) References Cited

U.S. PATENT DOCUMENTS

| | | |
|---|---|---|
| 9,145,946 B2 | 9/2015 | Heverly, II et al. |
| 9,202,098 B2 | 12/2015 | Lewis et al. |
| 9,308,822 B2 | 4/2016 | Matsuda |
| 9,404,891 B2 | 8/2016 | Lih et al. |
| 9,482,647 B2 | 11/2016 | Isom et al. |
| 9,561,863 B2 | 2/2017 | Conrad |
| 9,616,387 B2 | 4/2017 | Eager |
| 9,645,046 B2 | 5/2017 | Zhang et al. |
| 9,712,936 B2 | 7/2017 | Peters |
| 2003/0028332 A1 | 2/2003 | DiMaggio et al. |
| 2013/0013231 A1 | 1/2013 | Banerjee et al. |
| 2013/0116937 A1 | 5/2013 | Calhoun et al. |
| 2014/0355726 A1 | 12/2014 | Elenes et al. |
| 2015/0088435 A1* | 3/2015 | Isom ............ G01M 13/021 702/35 |
| 2015/0330867 A1* | 11/2015 | Potts ............ G01M 13/028 73/593 |
| 2016/0033580 A1 | 2/2016 | Qiao et al. |
| 2016/0195390 A1 | 7/2016 | Nissen et al. |
| 2016/0304192 A1 | 10/2016 | Hale et al. |
| 2017/0011560 A1 | 1/2017 | Sheldon et al. |
| 2017/0088257 A1 | 3/2017 | Heverly, II et al. |
| 2017/0089805 A1 | 3/2017 | Sheldon et al. |
| 2017/0336430 A1 | 11/2017 | Winslow et al. |
| 2018/0053359 A1 | 2/2018 | Hale |
| 2018/0162548 A1 | 6/2018 | Hale |
| 2018/0165897 A1 | 6/2018 | Hale |

FOREIGN PATENT DOCUMENTS

| | | | |
|---|---|---|---|
| EP | 1612458 A2 | 1/2006 | |
| EP | 1612458 A2 * | 1/2006 | ............ F16H 57/01 |
| EP | 2221732 A1 * | 8/2010 | ............ F16H 57/01 |
| EP | 2221732 A1 | 8/2010 | |
| EP | 2559988 A2 | 2/2013 | |
| EP | 2559988 A2 * | 2/2013 | ............ G01H 1/00 |
| EP | 3284668 A1 | 2/2018 | |
| EP | 3284669 A1 | 2/2018 | |
| EP | 3284670 A1 | 2/2018 | |
| EP | 3284671 A1 | 2/2018 | |
| EP | 3284670 B1 | 3/2019 | |
| EP | 3284671 B1 | 3/2019 | |
| WO | 2004059399 A1 | 7/2004 | |
| WO | WO-2004059399 A2 * | 7/2004 | ............ G01H 1/006 |
| WO | 2016099645 A1 | 6/2016 | |

OTHER PUBLICATIONS

Office Action, dated Mar. 6, 2019, by the USPTO, re U.S. Appl. No. 15/677,885.
Decision to Grant, dated Feb. 7, 2019, by the EPO, re EP Patent Application No. 17186726.0.
Decision to Grant, dated Feb. 14, 2019, by the EPO, re EP Patent Application No. 17186730.2.
Irvine; Power Spectral Density Units [G^2/ Hz]; Mar. 15, 2007.
Huang et al; The empirical mode decomposition and the Hilbert spectrum for nonlinear and non-stationary time series analysis; Jun. 3, 1996; Proc. R. Soc. Lond. A (1998) 454, 903-995.
Office Action, dated Jan. 10, 2019, by the USPTO, re U.S. Appl. No. 15/677,962.
European Search Report, dated Jan. 24, 2018, by the EPO, regarding EP Application No. 17186531.4.
European Search Report, dated Jan. 24, 2018, by the EPO, regarding EP Application No. 17186532.2.
European Search Report, dated Jan. 24, 2018, by the EPO, regarding EP Application No. 17186726.0.
European Search Report, dated Jan. 24, 2018, by the EPO, regarding EP Application No. 17186730.2.
Samuel et al.; A review of vibration-based techniques for helicopter transmission diagnostics; Journal of Sound and Vibration 282; pp. 475-508; Apr. 6, 2005.
Examination Report, dated Feb. 12, 2018, by the EPO, regarding EP Application No. 17186531.4.
Examination Report, dated Feb. 12, 2018, by the EPO, regarding EP Application No. 17186532.2.
Examination Report, dated Feb. 12, 2018, by the EPO, regarding EP Application No. 17186730.2.
EP Communication under Rule 71(3) EPC, dated Apr. 4, 2019, by the EPO, re EP Patent App No. 17186531.4.
EP Communication under Rule 71(3) EPC, dated Apr. 18, 2019, by the EPO, re EP Patent App No. 17186532.2.
Office Action-Restriction, dated May 16, 2019, by the USPTO, re U.S. Appl. No. 15/677,786.
Examination Report, dated Sep. 7, 2018, by the EPO, re EP Patent Application No. 17186532.2.
Examination Report, dated Sep. 10, 2018, by the EPO, re EP Patent Application No. 17186531.4.
Communication under Rule 71(3) EPC—Intention to Grant, dated Sep. 25, 2018, re EP Patent Application No. 17186730.2.
Communication under Rule 71(3) EPC—Intention to Grant, dated Sep. 28, 2018, re EP Patent Application No. 17186726.0.
Examination Report, dated Feb. 12, 2018, by the EPO, re EP Application No. 17186726.0.

* cited by examiner

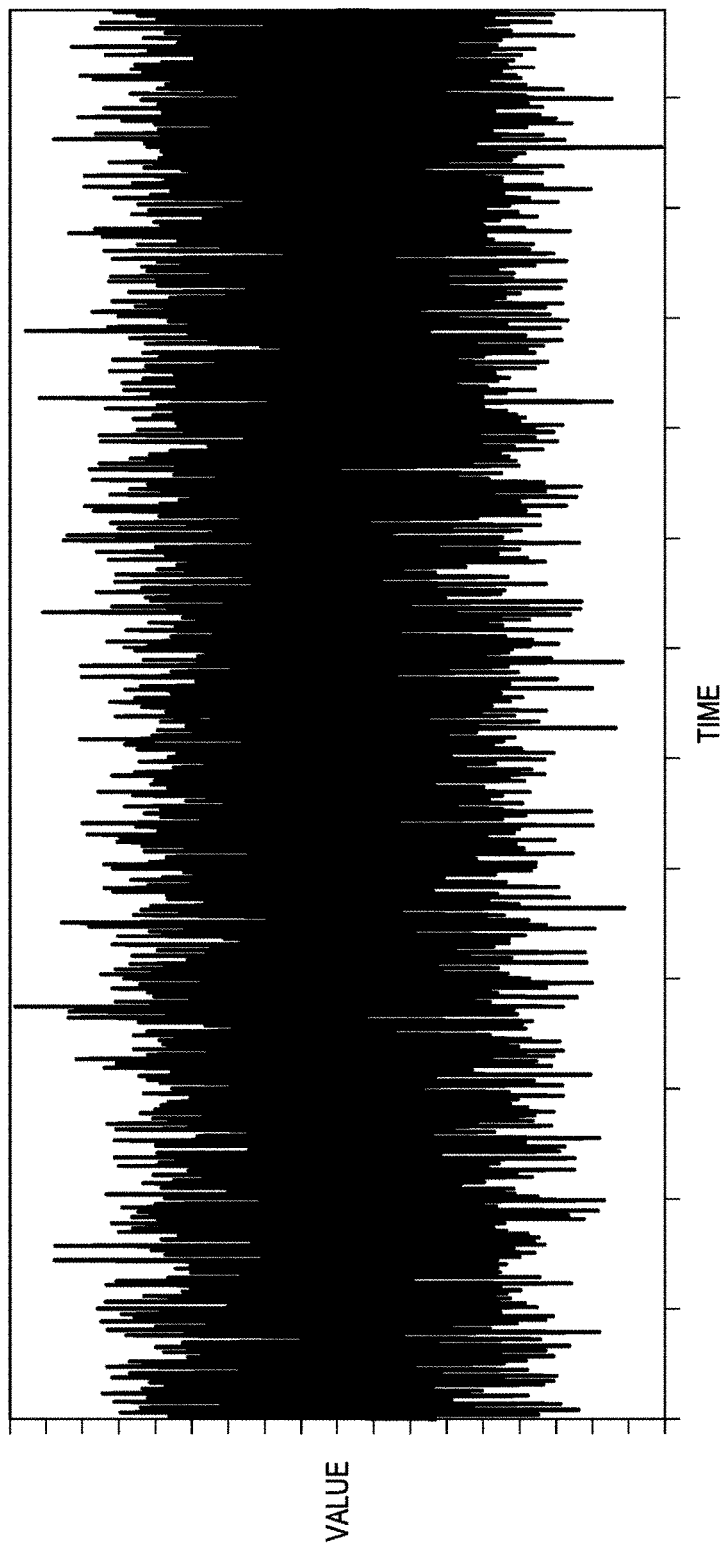

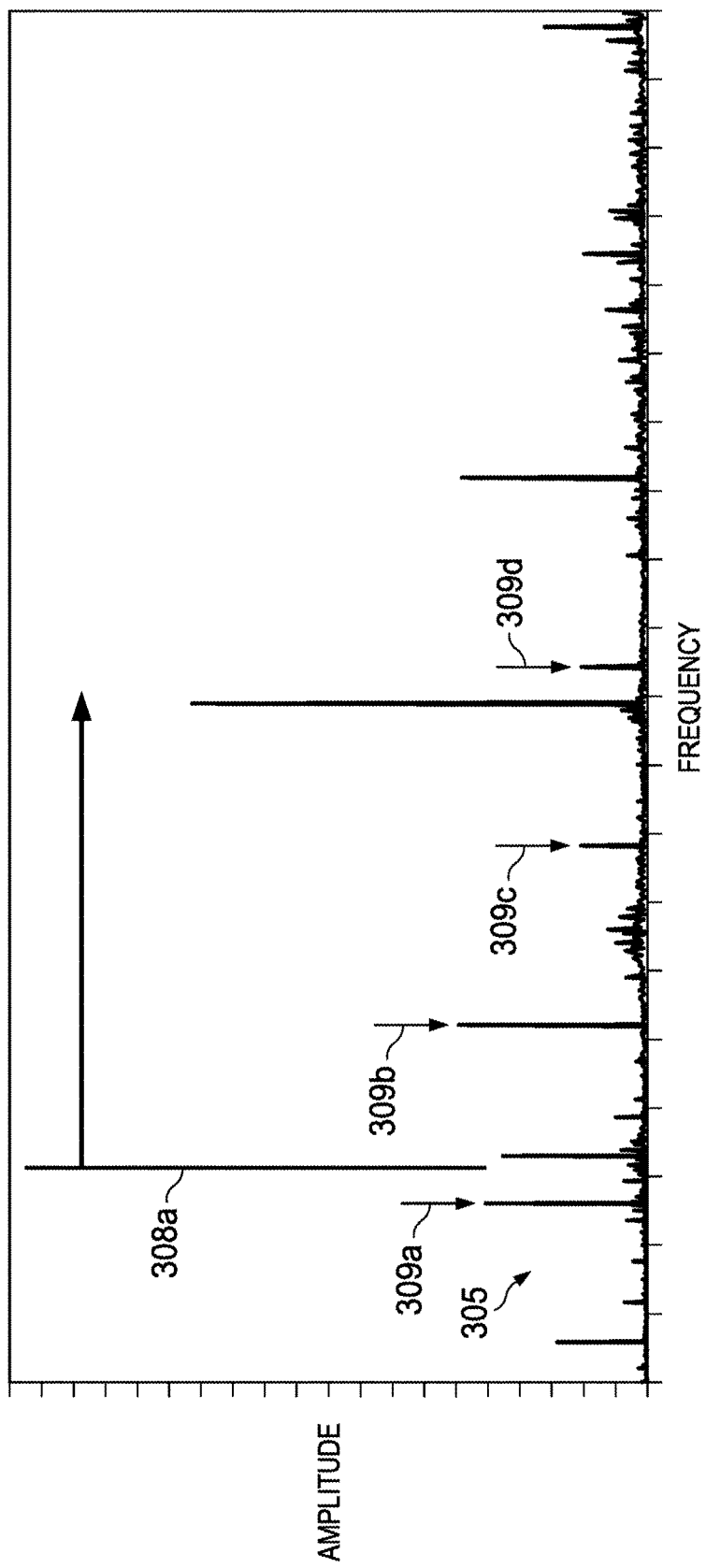

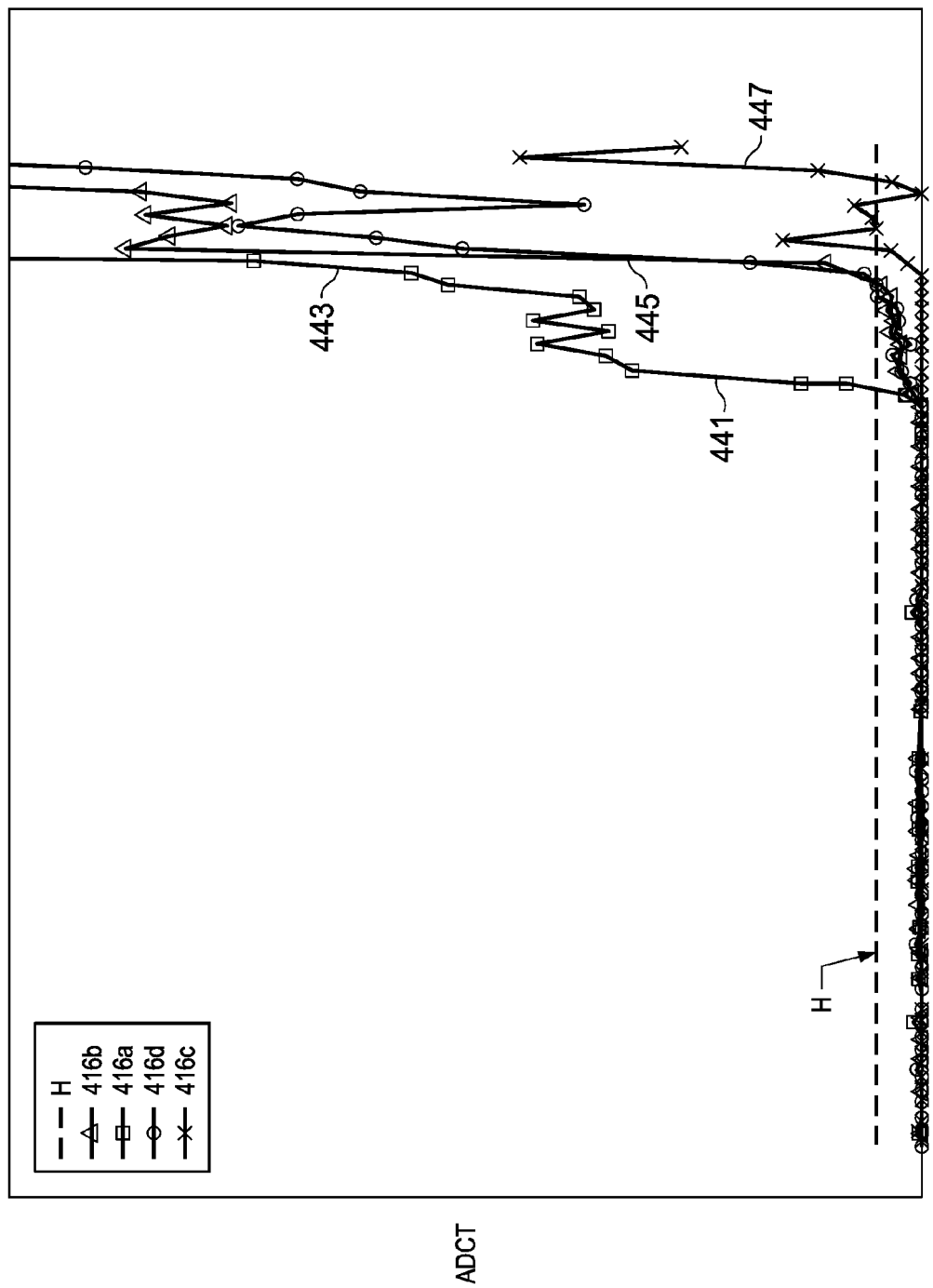

DIAGNOSTIC METHOD, SYSTEM AND DEVICE FOR A ROTORCRAFT DRIVE SYSTEM

CROSS-REFERENCE TO RELATED APPLICATION

This application claims priority to U.S. Patent Application No. 62/376,121, filed Aug. 17, 2016, which is incorporated herein by reference in its entirety.

BACKGROUND

Technical Field

The present disclosure relates to a method, system, and a device for diagnosing an anomaly in an aircraft drive system.

Description of Related Art

An aircraft, such as a rotorcraft or tiltrotor aircraft, may include one or more rotor systems. One example of a rotor system is a main rotor system. The main rotor system may generate aerodynamic lift to support the weight of the rotorcraft in flight and thrust to counteract aerodynamic drag and move the rotorcraft in forward flight. Another example of a rotorcraft rotor system is a tail rotor system. The tail rotor system may generate thrust in the same direction as the main rotor system's rotation to counter the torque effect created by the main rotor system. A rotor system may include a drive train with a gearbox that transmits energy from a power source to the rotor blade.

The rotor and drive system are conventionally monitored using traditional time synchronous methods that receive data from at least one accelerometer as well as a tachometer. The two different sensors are typically synchronized in a precise manner that is complicated and requires precise timing and very low noise in the tachometer signal. The complexity of the traditional time synchronous methods increases cost and introduces additional potential failure modes. Failures can be difficult to diagnose due to the interplay between the two sensors.

Other methods such as cepstrum analysis and wavelet techniques have been proposed but these have limited use in most rotorcraft health and usage monitoring systems ("HUMS") systems.

There is a need for an improved diagnostic system, method, and device for a drive system.

SUMMARY

In a first aspect, there is provided a method of diagnosing an anomaly of a monitored component in a drive train, the method including obtaining, by the device configured to diagnose an anomaly, rotational information associated with the component; receiving, by a device configured to diagnose an anomaly, original data indicating the toothmesh frequency of the drive train; filtering, by the device configured to diagnose an anomaly, the original data to remove energy above the toothmesh frequency; interpolating, by the device configured to diagnose an anomaly, the filtered original data to generate an integer number of samples per tooth passage; and generating, by the device configured to diagnose an anomaly, an amplified differential coherence (ADC).

In an embodiment, the rotational information comprises at least one of a rotating speed of the component and a total number of teeth of the component.

In one embodiment, the method includes determining a healthy or an unhealthy condition of the amplified differential coherence; if the amplified differential coherence is an unhealthy condition, then identifying an unhealthy component.

In another embodiment, the method further includes adjusting at least one of the operation and a maintenance of the monitored component.

In still another embodiment, the method includes generating, by the device configured to diagnose an anomaly, an amplified differential coherence gearbox arrangement value (ADCT).

In yet another embodiment, the method includes determining a healthy or an unhealthy condition of the amplified differential coherence gearbox arrangement value (ADCT), if the amplified differential coherence is an unhealthy condition, then identifying an unhealthy component.

In an embodiment, the method includes adjusting at least one of the operation and a maintenance of the unhealthy component.

In an embodiment, the step of generating an amplified differential coherence (ADC) includes the following steps: determining a first intermediary amplified differential coherence (ADCN); determining a second intermediary amplified differential coherence (ADCS); subtracting the second intermediary amplified differential coherence from the first intermediary amplified differential coherence to generate a third intermediary amplified differential coherence value; if the third intermediary amplified differential coherence value is less than zero, then set the third intermediary amplified differential coherence value to zero; if the third intermediary amplified differential coherence value is equal to zero or less than zero, then do not generate amplified differential coherence; and calculating the amplified differential coherence (ADC) using the third intermediary amplified differential coherence value.

In an embodiment, the device configured to diagnose an anomaly includes a display; wherein the device provides a real-time indication of an anomaly in the monitored component.

In another embodiment, the method includes storing a history, by the device configured to diagnose an anomaly, of original data; wherein the history being stored before the diagnostic operation for the component is performed.

In a second aspect, there is a device configured to diagnose an anomaly of a monitored component in a drive train, the device including a memory configured to store original data indicating a toothmesh frequency of the drive train; one or more processors in communication with the memory, the one or more processors being configured to: obtain rotational information associated with the component; receive the original data indicating a toothmesh frequency; filter the original data to remove the energy above the toothmesh frequency; interpolate the filtered original data to generate an integer number of samples per tooth passage; and generate an amplified differential coherence (ADC).

In an embodiment, the processors are configured to determine a healthy or unhealthy condition of the amplified differential coherence; if the amplified differential coherence is an unhealthy condition, then identify an unhealthy component.

In one embodiment, the processors are configured to generate an amplified differential coherence gearbox arrangement value (ADCT).

In another embodiment, the processors are configured to determine a healthy or unhealthy condition of the amplified differential coherence gearbox arrangement value (ADCT); if the amplified differential coherence is an unhealthy condition, then identify an unhealthy component.

In an embodiment, the device includes a display; wherein the device provides a real-time indication of an anomaly in the monitored component.

In one embodiment, the original data is stored before the diagnostic operation for the component is performed.

In a third aspect, there is a system for diagnosing an anomaly of a monitored component in a drive train, the system including: a rotorcraft comprising a body, a power train coupled to the body and comprising a power source and a drive train coupled to the power source; a vibration sensor system coupled to the drive train; and a diagnostic device associated with the vibration sensor system, the diagnostic device operable to: obtain rotational information associated with the component; receive original data indicating a toothmesh frequency of the drive train; filter the original data to remove the energy above the toothmesh frequency; interpolate the filtered original data to generate an integer number of samples per tooth passage; and generate an amplified differential coherence (ADC).

In an embodiment, the diagnostic system is further operable to generate an amplified differential coherence gearbox arrangement value (ADCT).

In one embodiment, the vibration sensor system comprises at least one accelerometer.

In a fourth aspect, there is a non-transitory computer-readable storage medium encoded with instructions that, when executed, cause one or more processors of a computing device to diagnose an anomaly of a monitored component in a drive train to: obtain rotational information associated with the component; receive original data indicating a toothmesh frequency of the drive train; filter the original data to remove the energy above the toothmesh frequency; interpolate the filtered original data to generate an integer number of samples per tooth passage; and generate an amplified differential coherence (ADC).

Other aspects, features, and advantages will become apparent from the following detailed description when taken in conjunction with the accompanying drawings, which are a part of this disclosure and which illustrate, by way of example, principles of the inventions disclosed.

DESCRIPTION OF THE DRAWINGS

The novel features believed characteristic of the embodiments of the present disclosure are set forth in the appended claims. However, the embodiments themselves, as well as a preferred mode of use, and further objectives and advantages thereof, will best be understood by reference to the following detailed description when read in conjunction with the accompanying drawings, wherein:

FIG. 3D is graph illustrating original data, according to an exemplary embodiment;

FIG. 3E is a graph illustrating filtering of original data, according to an illustrative embodiment;

FIG. 6A is a prophetic example of a graph illustrating the time history of ADCT from four sensor locations through a component degrading;

DESCRIPTION OF THE PREFERRED EMBODIMENT

Illustrative embodiments of a method, system, and device for diagnosing an anomaly in an aircraft drive system are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
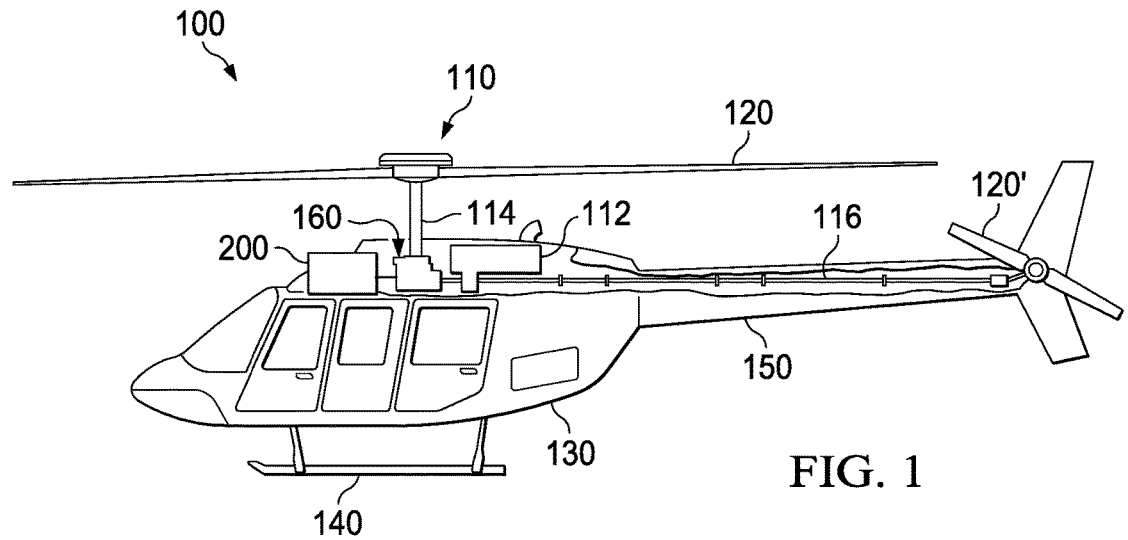
FIG. 1 is a side view of a rotorcraft, according to an example embodiment.

Referring to FIG. 1 in the drawings, a rotorcraft 100 is illustrated. Rotorcraft 100 can include drive train system 110, main rotor blades 120, tail rotor blades 120', a fuselage 130, a landing gear 140, and a tail member 150. Drive train system 110 may rotate blades 120 and/or blades 120'. Drive train system 110 and blades 120' may collectively provide thrust in the same direction as the rotation of blades 120 so as to counter the torque effect created by blades 120.

Fuselage 130 represents the body of rotorcraft 100 and may be coupled to drive train system 110 such that drive train system 110 and blades 120 move fuselage 130 through the air. Landing gear 140 supports rotorcraft 100 when rotorcraft 100 is landing and/or when rotorcraft 100 is at rest on the ground. The tail member 150 represents the tail section of the aircraft and features blades 120'.

Figure 2A:
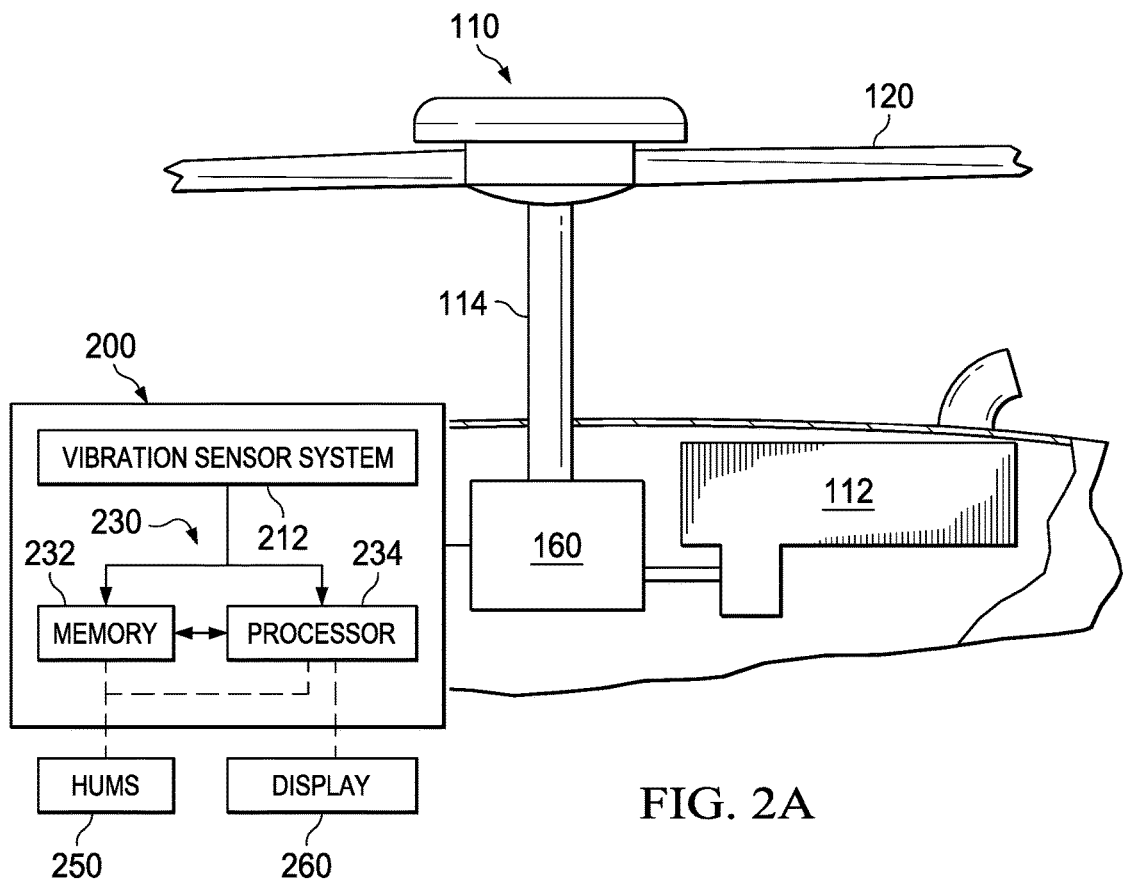
FIGS. 2A-2B shows exemplary diagnostic systems with a drive train system for a rotorcraft.
Figure 2B:
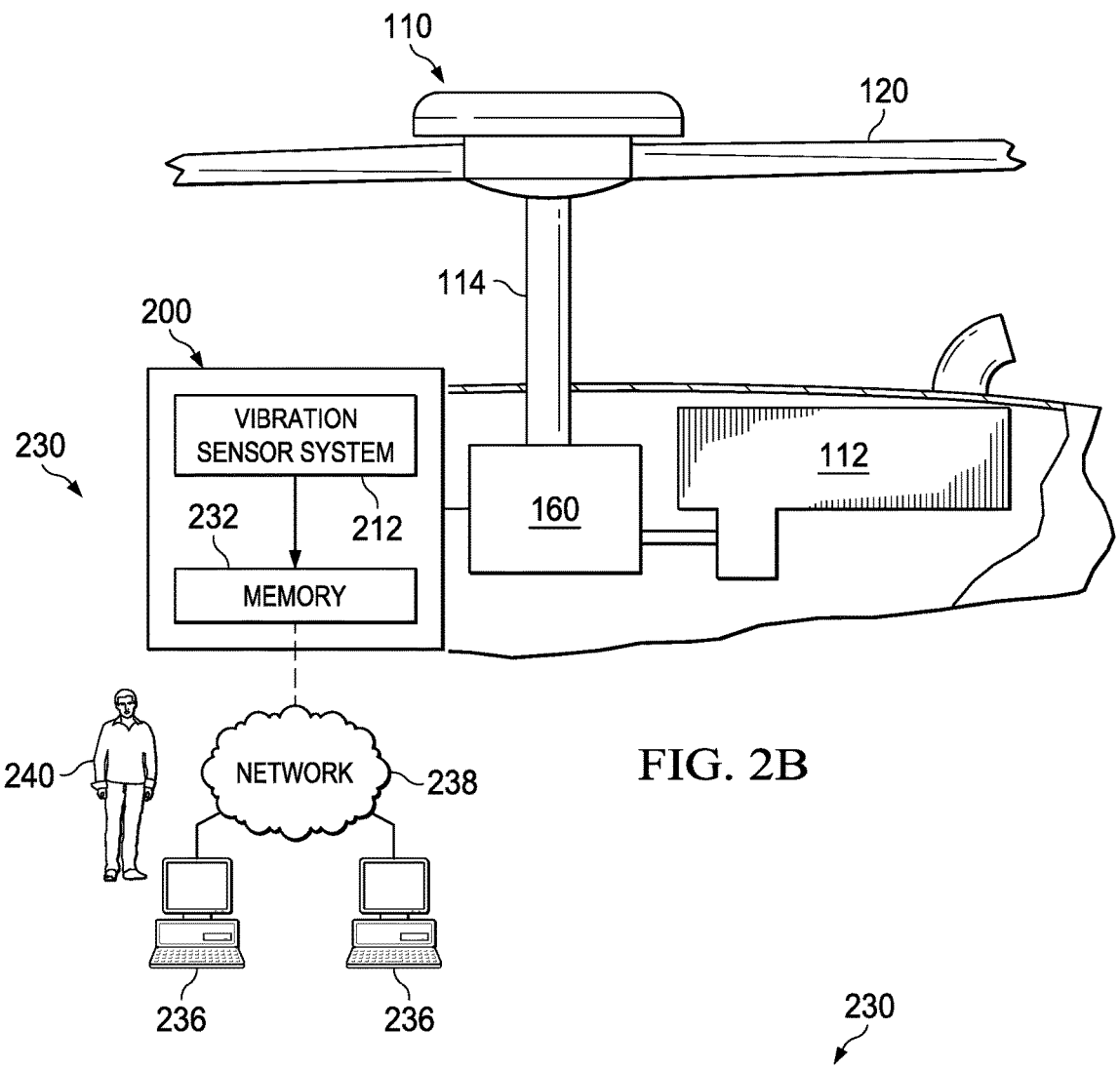

In the example shown in FIGS. 1 and 2A-2B, drive train system 110 includes an engine 112, a gearbox 160, a main rotor mast 114, and a tail rotor drive shaft 116. Engine 112 supplies torque to the main rotor mast 114 via gearbox 160 for rotating of blades 120. Engine 112 also supplies torque to tail rotor drive shaft 116 for rotating of blades 120'. In the example of FIG. 1, gearbox 160 is a main rotor transmission system. Teachings of certain embodiments recognize, however, that drive train system 110 may include more or different gearboxes than gearbox 160 shown in FIGS. 1 and 2A-2B 1. Drive train system 110 may include a control system for selectively controlling the pitch of each blade 120 in order to selectively control direction, thrust, and lift of rotorcraft 100. Gears, bearings, main rotor mast, and tail rotor drive shaft, and other mechanical components or systems of drive train 110 produce vibrations due to contact and movement with other components during operation.

Rotorcraft 100 further comprises a diagnostic system 200 for detecting an anomaly of a monitored component configured to identify and alert an operator, technician, or manufacturer to vibratory anomalies that may reflect a malfunctioning gear, bearing or other drive system related component. It should be appreciated that teachings from rotorcraft 100 may apply to aircraft other than rotor, such as airplanes, tiltrotor, hovercraft, unmanned aircraft, to name a few examples, and may apply to other industries including, but not limited to, automotive, ships, and industrial applications involving fixed equipment with rotational elements. The embodiments herein are illustrated with regard to a drive train for a main rotor assembly on a rotorcraft; however, it should be appreciated that the embodiments may be adaptable to a tail rotor assembly.

Diagnostic system 200, as shown in FIGS. 2A-2B, can include a vibration sensor system 212 coupled to the drive train 110 and a diagnostic device 230, as shown in FIGS. 1 and 2A-2B. The diagnostic device 230 can represent any form of computing device capable of implementing the techniques described in this disclosure, including a handset (or cellular phone), a tablet computer, a smart phone, or a desktop computer. Diagnostic device 230 is configured to diagnose an anomaly in the component or system being monitored and can be operated by a user. In one embodiment, as shown in FIG. 2A, diagnostic device 230 is disposed on a rotorcraft 100. In another embodiment, as shown in FIG. 2B, at least a portion of the diagnostic device 230 is disposed on the rotorcraft and can be implemented by one or more computers across one or more networks.

Figure 3A:
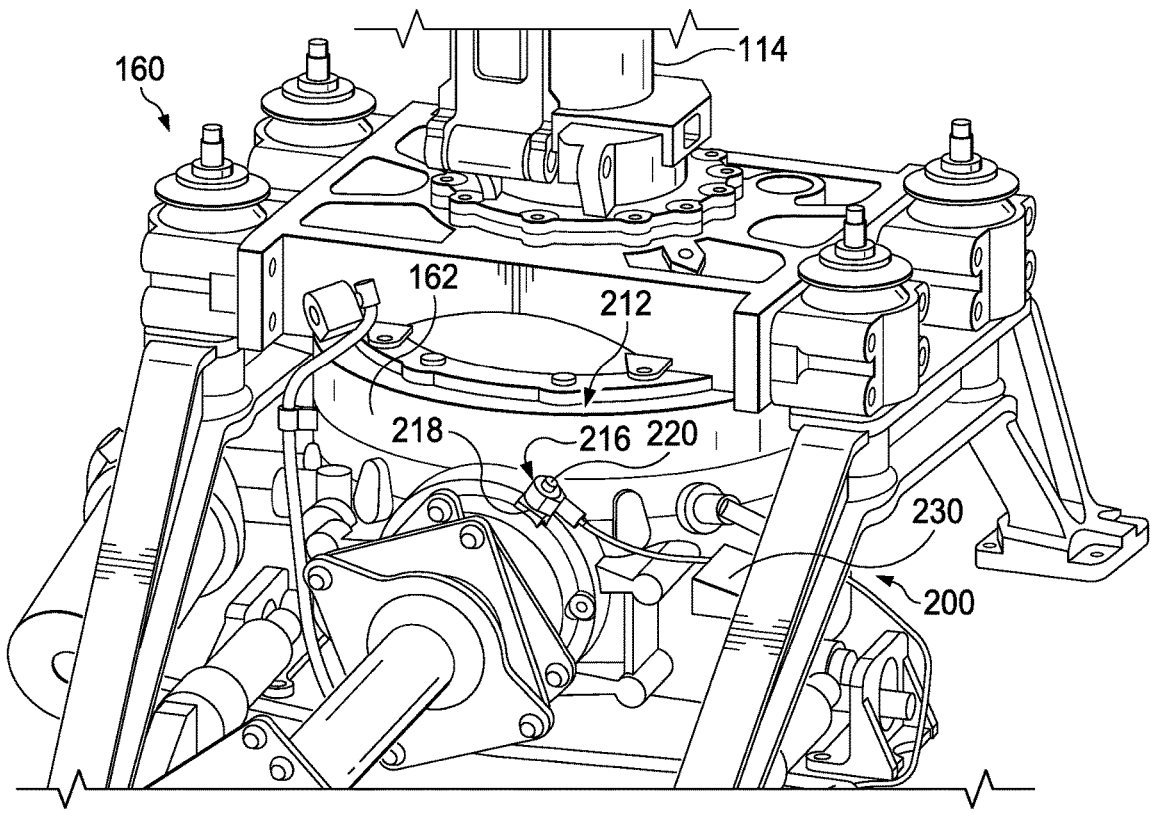
FIG. 3A is a perspective view of a gearbox in a drive train system; according to an illustrative embodiment.
Figure 3B:
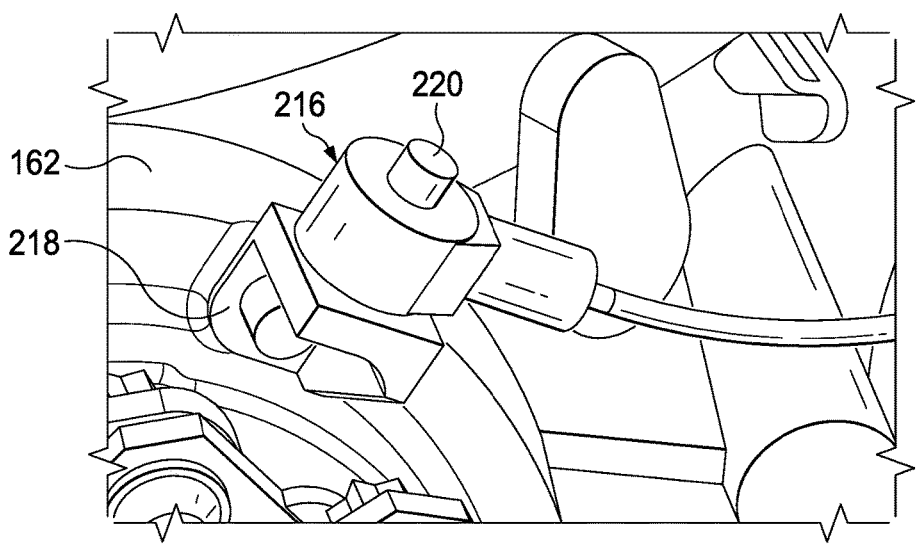
FIG. 3B is a perspective view of a sensor mounted to the gearbox in FIG. 3A.
Figure 3C:
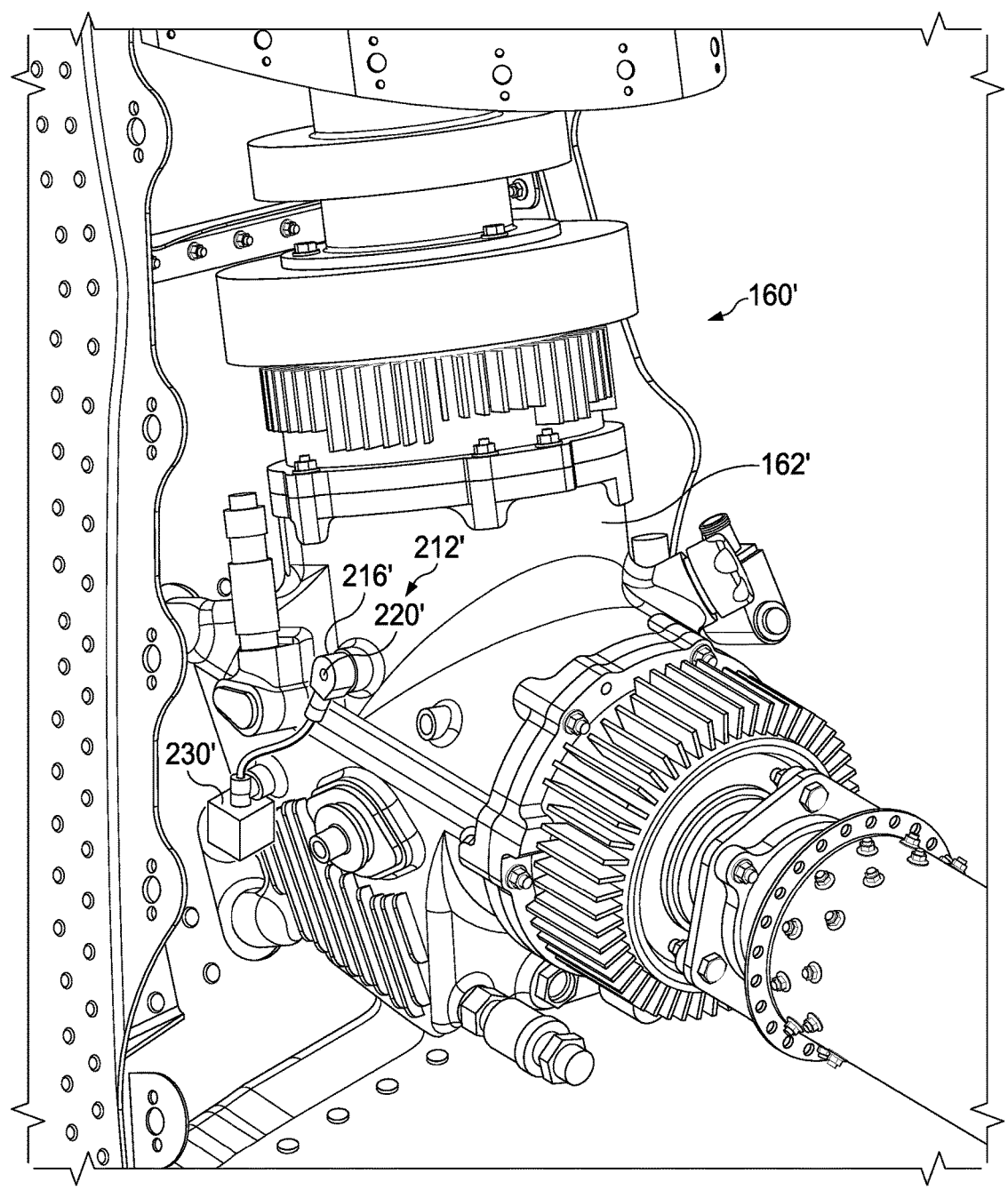
FIG. 3C is a perspective view of sensor mounted to a gearbox, according to an illustrative embodiment.

Referring now to FIGS. 3A-3C, vibration sensor system 212 can include one or more vibration sensors 216 configured to measure at least one of vibration, sound, and/or acoustic signals within and/or produced from the monitored component and/or system. In an embodiment, the vibration sensor 216 is, includes, or is part of an accelerometer. In an embodiment, only one sensor 216 is located on a gearbox 160 to monitor the health of the drive train 110. For example, as shown in FIGS. 3A-3B, one or more vibration sensors 216 can be coupled to the gearbox 160. In an embodiment, at least two, three, four, five, six or more vibration sensors 216 are provided to monitor the health of the monitored component or system. A further embodiment provides a plurality of sensors to monitor the health of the drive train 110 and/or a component thereof.

Vibration sensors 216 can comprise accelerometers configured to provide a signal output corresponding to the acceleration of the sensors 216 in various directions (e.g., fore-aft, lateral, and vertical directions). In other embodiments, vibration sensors 216 can comprise other types of sensors capable of measuring vibration of a drive train system 110, such as a single-axis sensor, a multiple-axis sensor, a piezo electric sensor (either integrated electronics or with separate charge converter), and a micro electro-mechanical system (MEMS) type of sensor, and the like. In an embodiment, the vibration sensors 216 are only accelerometers.

The vibration sensor 216 may be connected directly to the monitored component or system and/or may include a bracket 218 attached to the vibration sensor 216. In an exemplary embodiment shown in FIGS. 3A-3B, vibration 216 is mounted to bracket 218. Bracket 218 is coupled to gearbox case 162 with a fastener 220 (e.g., a bolt, pin, screw, etc.). Vibration sensor 216 may be externally mounted directly to a monitored component or system. An illustrative embodiment shown in FIG. 3C, like features are identified by like numerals with a primed (') suffix and new features are identified by new numerals, includes a rotorcraft gearbox 160' and gearbox case 162', sensor 216' is coupled via a direct mounting connection to gearbox case 162'. Sensor 216' is secured to an extended fastener 220' having an extended length for receiving the sensor 216' thereon and also secures portions of the gearbox case 162' or other components of the drive train 110 together.

One or more vibration sensors 216 can be disposed at one or more locations on drive train 110 to monitor the health of the drive system 110 or other rotational systems. Vibration sensor 216 can be coupled to at least one of a gearbox, a bearing housing, a hanger bearing housing, a swashplate bearing housing, an engine, a transmission gearbox, engine gearbox, an oil blower, an oil cooler, a main rotor mast, a tail rotor drive shaft, a rotating component in drive train system, and a rotating system in a drive train system. Sensor 216 can be disposed on, in, in a passage adjacent to, or, near the monitored component or system. In an embodiment, vibration sensor 216 is disposed on a gearbox adjacent to gears therein. In the exemplary embodiment shown in FIG. 3A-3B, the sensor 216 is disposed adjacent to the input drive of gearbox 160. In another embodiment shown in FIG. 3C, the sensor 216' is disposed on mid-case of gearbox 160'.

During operation, gearbox 160 may transmit power from a power source (e.g., engine 112) to the object(s) to be moved (e.g., components in the drive train 110), which produces vibrations, sounds, and/or acoustic signals. The vibration sensor systems 212, 212' are each configured to measure vibrations, sounds, and/or acoustic signals from the drive train 110 and send an output of original data, as shown in FIG. 3D, (e.g., the measurements of the vibrations, sounds, and/or acoustic signals) to the diagnostic device 230, 230', as shown in FIGS. 3A and 3C. In some embodiments, the vibration sensor system 212, 212' can provide rotational information associated with the monitored component or system.

Figure 4:
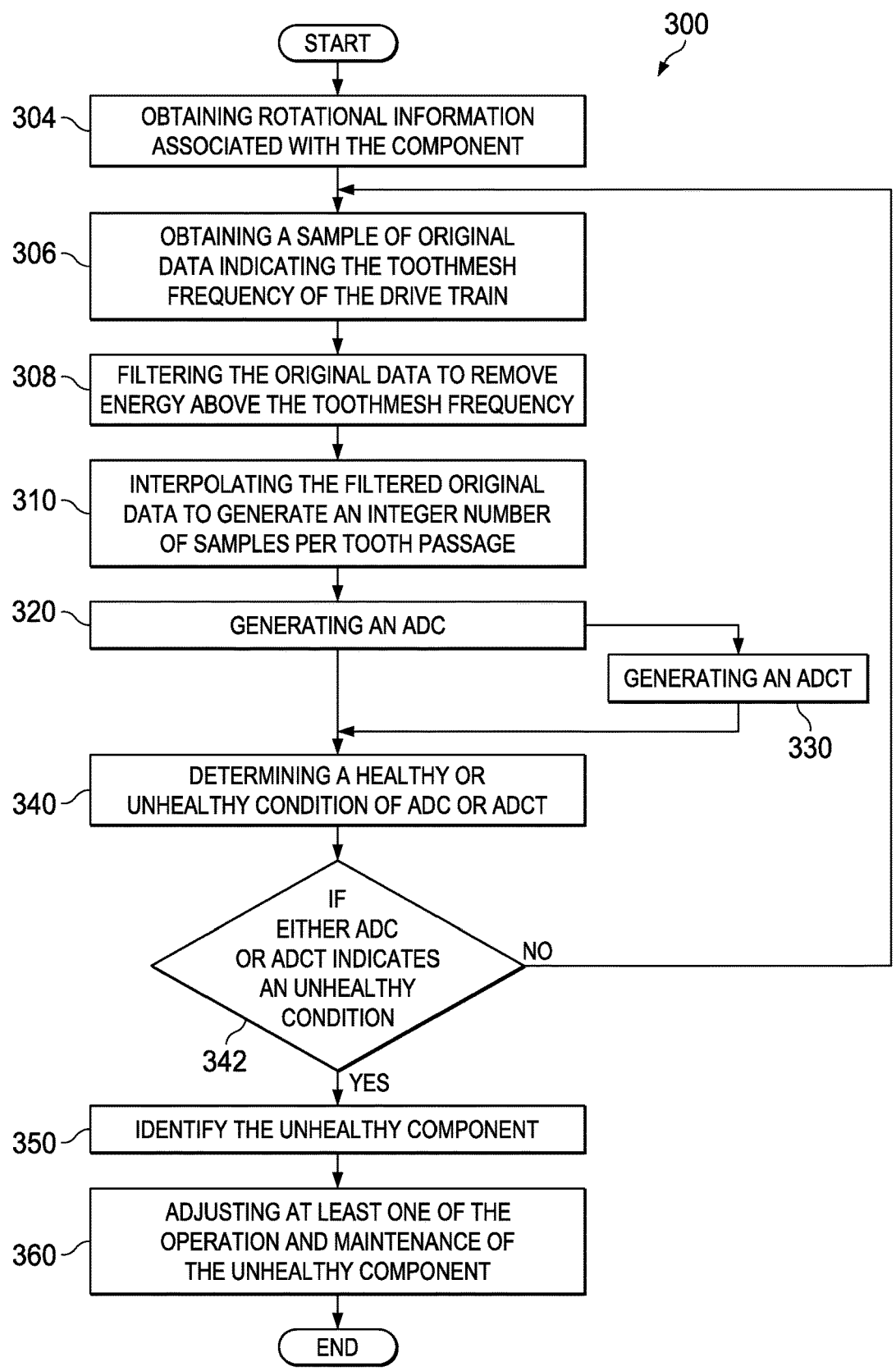
FIG. 4 is a flowchart showing an exemplary diagnostic method, according to an exemplary embodiment.

Diagnostic device 230 is configured to implement the method 300 of diagnosing an anomaly of a monitored component in a drive train 110. Method 300, as shown in FIG. 4, can include at least one or more of the following steps: step 304 of obtaining rotational information associated with the component; step 306 of receiving original data indicating a toothmesh frequency of the drive train 110; step 308 of filtering original data to remove energy above the toothmesh frequency; step 310 of interpolating the filtered original data to generate an integer number of samples per tooth passage; step 320 of generating an amplified differential coherence (hereinafter referred to as "ADC"); step 330 of generating an amplified differential coherence gearbox arrangement value (hereinafter referred to as "ADCT"); step 340 of determining a healthy or unhealthy condition of the ADC or ADCT, step 342 of if either ADC or ADCT is an unhealthy condition, then continue to step 350 of identifying the unhealthy component; and step 360 of adjusting at least one of the operation and maintenance of the unhealthy component.

Step 304 of obtaining rotational information associated with the component can include rotational information related to one or more components within the drive train 110. In an embodiment, the rotational information can include the rotating speed of the component and a total number of teeth of the component.

In an embodiment, in step 306 the toothmesh frequency can be a complex, broad vibration spectrum with frequencies below the shaft rotational speed sand extending to several multiples of toothmesh frequency (e.g., the number of gear teeth times shaft rpm). The amplitude at toothmesh frequency may vary greatly from gear to gear, depending on the number of teeth, gear, ratio, tooth surface finish, and load. When a gear or other drive train component becomes damaged the harmonics of the toothmesh frequency changes, under current diagnostic systems and methods, it can be difficult to identify a toothmesh frequency change and the particular damaged component.

Step 308 of the method 300 can include filtering the original data to remove energy above the toothmesh frequency. In an embodiment, the original data is low-pass filtered to remove and/or at least greatly attenuate the energy above the toothmesh frequency (e.g., below the filter attenuation range at about 308a) as shown in the illustrative example in FIG. 3E. The original data 305 and toothmesh frequency (e.g., the first harmonic) 309a is identified below the filter attenuation range starting at about 308a. In step 308, the energies above the toothmesh frequency (e.g., second harmonic 309b, third harmonic 309c, fourth harmonic 309d, and other non-harmonic energy) are removed to generate a filtered original data. The filtered original data from step 308 is then interpolated in step 310 to get an integer number of samples per tooth passage. The rotating speed and number of teeth of the component being assessed is used to set the interpolation parameters.

The ADC is generated in step 310 may be defined as follows:

$$\text{If } (ADCN_i - ADCS_i) < 0, \text{ then set } (ADCN_i - ADCS_i) = 0$$

$$ADC = \frac{1}{n}\sum_{i=1}^{n}(ADCN_i - ADCS_i)^2$$

ADCN can be defined as a first intermediary amplified differential coherence. ADCN is the coherence evaluated at the toothmesh frequency between the first T/2 teeth of revolution i and the first T/2 teeth of revolution i+1 of the component being assessed, where T is the number of teeth on the monitored component (e.g., the gear being assessed). ADCS can be defined as a second intermediary amplified differential coherence. ADCS is the coherence evaluated at the toothmesh frequency between the first T/2 teeth of revolution i and the last T/2 teeth of revolution i of the component being assessed.

Generating the ADC includes the steps of determining the ADCN, determining the ADCS, and subtracting the ADCS from the ADCS. a first intermediary amplified differential coherence (ADCN); determining a second intermediary amplified differential coherence (ADCS); and subtracting the second intermediary amplified differential coherence from the first intermediary amplified differential coherence to generate a third intermediary amplified differential coherence value, and calculating the ADC using the third intermediary amplified differential coherence value. If the third intermediary amplified differential coherence value is less than zero, then the third intermediary amplified differential coherence value is set to zero. If the third intermediary amplified differential coherence value is equal to zero or less than zero, then do not generate amplified differential coherence. An embodiment provides that when the vibration or acoustic signal associated with the monitored component is much higher than surrounding noise, the first intermediary amplified differential coherence (ADCN) is about 1; when the ADCN decreases or approaches or is about zero, this indicates that either the noise is much greater than the signal (which indicates poor data quality) or that the monitored component or system cannot be "heard" well enough by vibration sensor 216. In addition to ADCN being a primary component of the steps to generate ADC, ADCN can be a standalone validity checker of the original data as well as a go-no-go assessor of whether the vibration sensor 216 "hears" or is monitoring the component being assessed well enough to generate ADC. In an embodiment, the vibration sensor 216 can be moved or otherwise relocated or repositioned on the gearbox case 162 to a position where the vibration sensor 216 can monitor a component to generate ADC.

Once the ADC is generated, the ADCT can be generated in step 330. ADCT may be defined as follows:

$$ADCT = \frac{S}{n}\sum_{i=1}^{n}(ADCN_i - ADCS_i)^2$$
$$= S * ADC$$

S=10*(the number of primary load path gear mesh frequencies+1)

ADCT is the ADC multiplied by a gearbox arrangement value S, which can also be referred to as a gearbox simplicity factor. The gearbox arrangement value increases with the number of independent gear mesh frequencies. For example, a planetary gear has one mesh frequency, if there are three planetary gears, then the gearbox arrangement value is 40.

Once the ADC and/or the ADCT has been generated, a user can efficiently monitor trends of the ADC and/or ADCT to enable a user to make more highly informed decisions regarding operation of the aircraft, proactive inspection, and/or maintenance relating to aircraft components. In an exemplary embodiment, ADC and/or ADCT can be tracked or plotted to determine if the ADC and/or ADCT indicate a healthy or unhealthy condition. In an embodiment, the ADCN and ADCS along with the ADC and/or ADCT are tracked to identify a range of a healthy condition of the component being monitored. When ADC and/or ADCT are in an unhealthy condition, at least one of ADC or ADCT are above the range of the healthy condition.

Figure 5A:
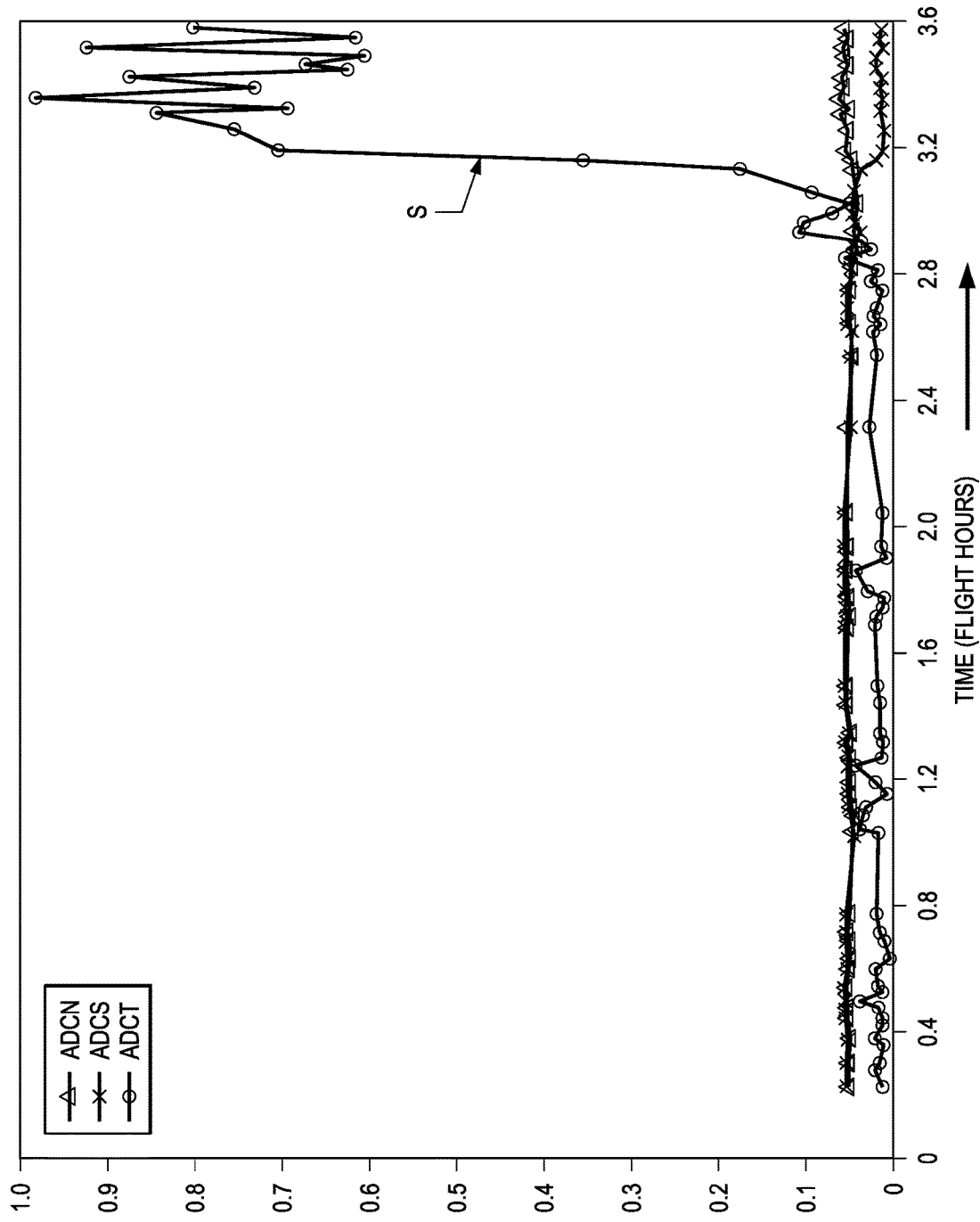
FIG. 5A is a graph illustrating the time history of ADCN, ADCS, and ADCT through a gearbox component degrading, according to an illustrative embodiment.
Figure 5B:
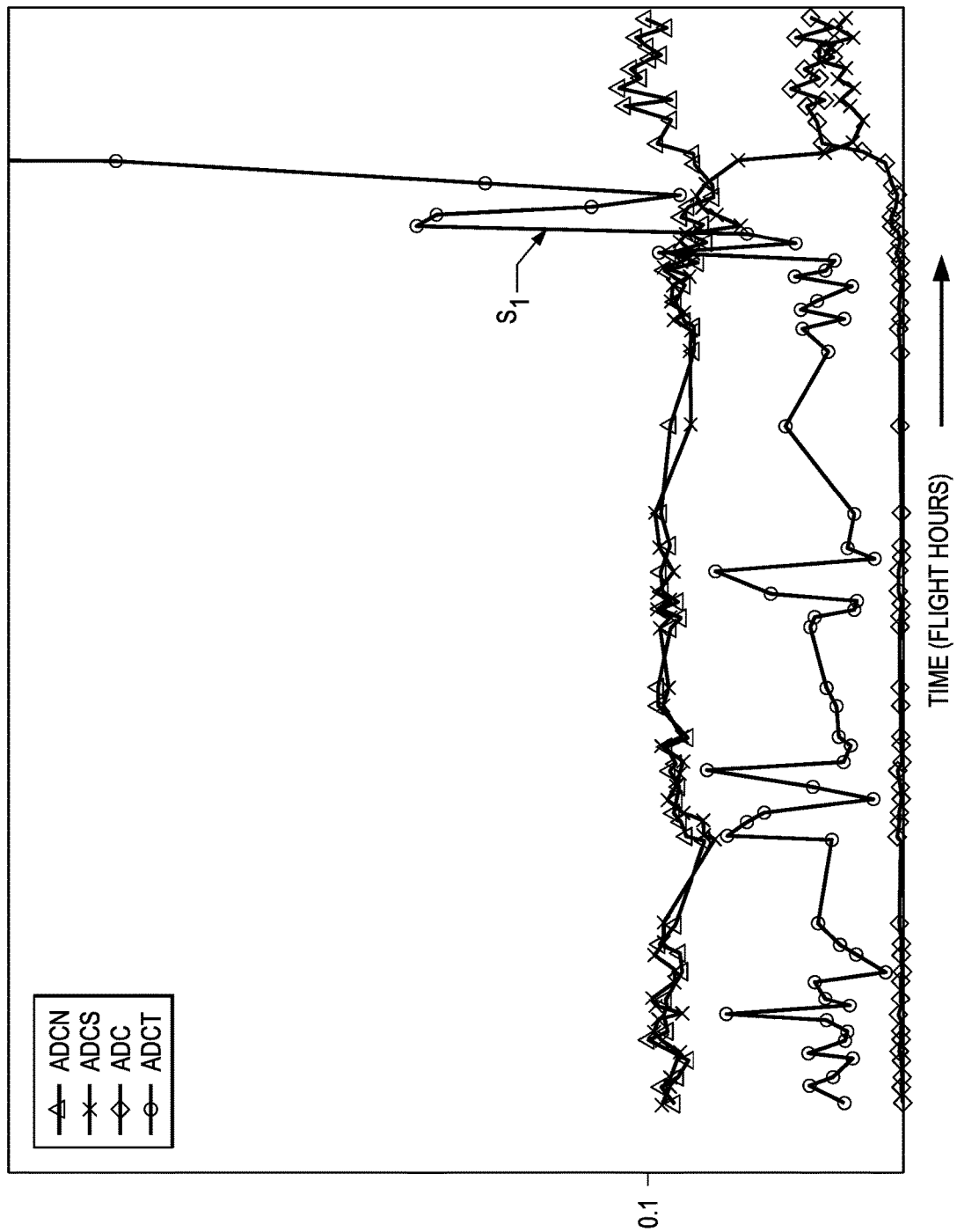
FIG. 5B is a graph illustrating the time history of ADCN, ADCS, ADC, and ADCT through a gearbox component degrading, according to an illustrative embodiment.

Referring now to FIGS. 5A-5B, exemplary graphs of ADCN, ADCS, ADC, and ADCT are illustrated for a monitored component in a drive train 110. The X axis represents the flight hours of the component. The Y axis represents the numerical range of ADCT, ADCN, and ADCS. When a monitored component in drive train 110 has an ADCT below 0.1, the ADCT indicates that the monitored component is in a healthy condition. In this example, ADCT indicates an unhealthy condition as ADCT increases over 0.1 as indicated by first spike S in FIG. 5A and a first spike $S_1$ in FIG. 5B.

ADC and/or ADCT can be used to identify a particular component being monitored in step 350. For example, but not limitation, the location sensor 216 indicating original data that has a ADC and/or ADCT in an unhealthy condition can be disposed adjacent to or near the component indicating an ADC and/or ADCT in an unhealthy condition. In another embodiment, the vibration sensor system 212 includes a plurality of sensors 216 at locations on the gearbox case 162, which provide a plurality of ADC and/or ADCT determinations that correspond to the plurality of sensors 216. The healthy condition range can be determined from the plurality of ADC and/or ADCT determinations, and when one or more ADC and/or ADCT are above the healthy condition range, an unhealthy condition can be identified for a particular sensor 216. The location of the sensor and the ADC and/or ADCT can be used to identify an unhealthy component in the drive train 110. In some embodiments, the unhealthy component can include a plurality of unhealthy components.

Figure 6B:
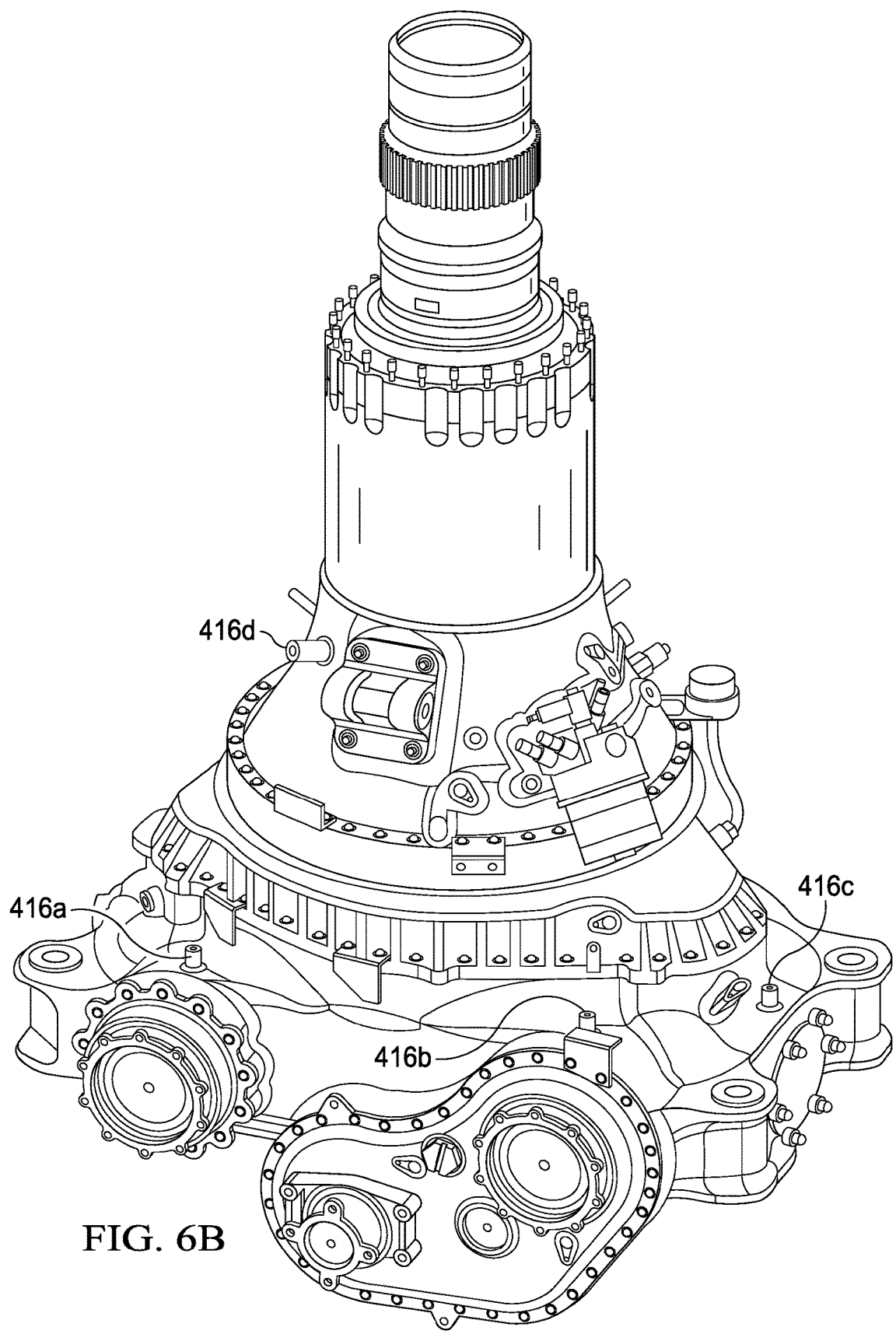
FIG. 6B is a prophetic example illustrating four sensors disposed on a gearbox.

An example graph of four plots of ADCT is shown in FIG. 6A for accelerometer sensors 416 disposed at four locations on the gearbox 460 shown in FIG. 6B. In this example, the X axis in FIG. 6A represents flight hours of the gearbox 460. The Y axis in FIG. 6B represents the numerical range of ADCT for each of the four accelerometer sensors 416a, 416b, 416c, 416d. Each of the four accelerometer sensors are coupled to the gearbox case 462 as shown in FIG. 6B. First sensor 416a is disposed adjacent to the left-hand drive input, second sensor 416b is disposed adjacent to the right-hand drive input, third sensor 416c is disposed adjacent to the accessory output; and fourth sensor 416d is disposed at the top of the case adjacent to the planetary gears of gearbox 460. As illustrated in FIG. 6A, all four sensors 416a-d are indicating ADCT determinations in a healthy condition range H until first spike 441. First spike 441 demonstrates that the ADCT for first sensor 416a is indicating an unhealthy condition for the bull gear in the gearbox 460. The ADCT continues to increase as indicated in second spike 443 indicating that the unhealthy condition is continuing for component bull gear. A third spike 445 shows ADCT determinations for both the second and fourth sensors 416b, 416d is now indicating unhealthy conditions for the bull gear component in gearbox 460. The third sensor 416c as shown by ADCT spike 447 indicates an unhealthy condition of the bull gear component. In addition, the ADCT determinations of the four sensors 416a-d can be used to indicate a preferred location of a sensor to identify an unhealthy condition of a monitored component. For example, the preferred location is first sensor 416a for determining an unhealthy condition of a bull gear in gearbox 460 since the first sensor 416a first determined the unhealthy condition as compared to the second, third and fourth sensors 416b-d.

Step 360 includes adjusting at least one of the operation and maintenance of the unhealthy component in the drive train 110. In a particular embodiment, once the unhealthy component in the drive is identified, step 360 can include the pilot, crew, or other user remote from the aircraft adjusting the aircraft speed or other operational parameters to reduce, disengage or otherwise lessen the impact of the unhealthy component in the drive train 110 from damage and/or to reduce the likelihood of catastrophic failure during flight. In an embodiment, the maintenance of the unhealthy component in the drive train 110 can be adjusted by determining when the unhealthy component should be repaired and/or replaced. In some embodiments, method 300 may predict upcoming replacement and/or repair times of an unhealthy component to ensure that the component is not replaced and/or repaired prematurely. Since the unhealthy component can be identified prior to failure using the systems, methods and devices descried herein, the unhealthy component can advantageously be repaired or replaced prior to damaging other components in the drive train 110.

Diagnostic system 200 may be installed on-board an aircraft 100 (as indicated in FIG. 2A), off-board (such as at a ground facility), or a combination of the two (as indicated in FIG. 2B). In an exemplary embodiment, when diagnostic system 200 is installed on-board aircraft 200, diagnostic system 200 can include a member 232 and a processor 234. In an embodiment, memory 232 is configured to store the output of original data indicative of the vibration, sounds, and/or acoustic signals over time. In an embodiment, the output of original data is stored in memory 232 at least before the diagnostic method 300 is initiated. Memory 232 represents any suitable storage mechanism and may store any data for use by a computer system. Memory 232 may comprise one or more tangible, computer-readable, and/or computer-executable storage medium. Examples of memory 232 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium. In an embodiment, processor 234 is configured to process original data from the vibration sensor system 212 and/or memory 232.

Diagnostic system 200 can include or otherwise be operably associated with a health and usage monitoring system (HUMS) 250 and a display 260. In an embodiment, HUMS 250 can receive outputs from the processor 234 regarding the health condition of the monitored component or system. In an embodiment, HUMS 250 can store original data in addition to memory 232. In some embodiments, HUMS 250 can store original data and the memory 232 is not included. In one embodiment, display 260 can receive outputs from the processor 234 that provide a visual indication of real-time health condition of the monitored component or system. Accordingly, a pilot of the rotorcraft 100 can be alerted to the real-time health condition of the monitored component in the drive train 110.

In another embodiment, as shown in FIG. 2B, diagnostic system 200 can be implemented by one or more computer systems 236 across one or more networks 238 and accessible by a user 240. Diagnostic system 200, as shown in FIG. 2B, can be configured to store original data related to the monitored component or system in memory 232. In an embodiment, the output of original data is stored in memory 232 at least before the original data is transmitted to one or more computers 236. The original data obtained by vibration sensor system 212 is transferred to one or more computer systems 236, typically after each flight. Computers systems 236 can be fixed or mobile on a ground station at various locations (e.g., an airport, military base, command center, manufacturer). The original data can be transferred over network 238 and/or using physical cabling or media; for example, but not limited to, hardwire cabling such as parallel cables, serial cables, USB cables, Firewire cables or the like or wireless protocols such as Bluetooth connectivity, infrared connectivity, radio transmission connectivity, Wi-Fi connectivity, other suitable communications protocol, removable memory cards, flash memory mass device, solid-state floppy disk card, non-volatile memory card, or other suitable memory storage entity.

Figure 7:
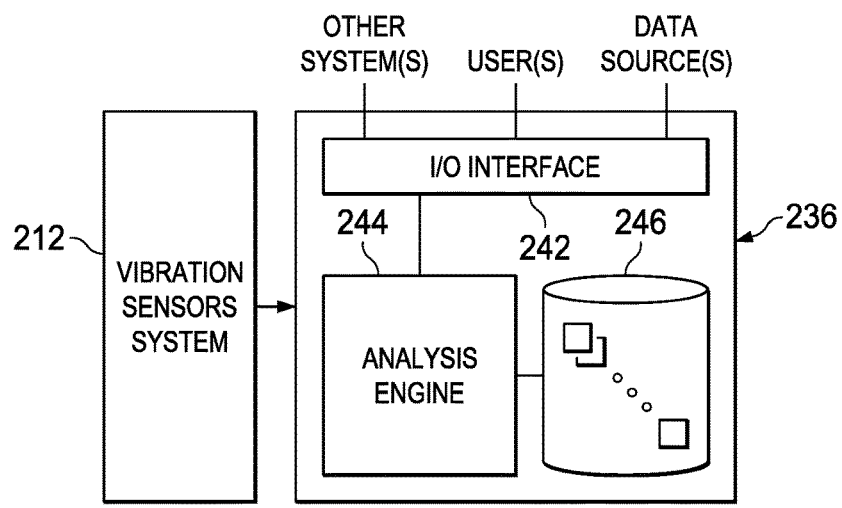
FIG. 7 is a schematic block diagram of a computer system, according to an illustrative embodiment.

Diagnostic system 230 can include computer system 236 as shown on FIG. 7. Computer system 236 can include an input/output (I/O) interface 242, an analysis engine 244, and a database 246. Alternative embodiments can combine or distribute the input/output (I/O) interface 242, analysis engine 244, and database 246, as desired.

Embodiments of system 236 can include one or more computers that include one or more processors and memories configured for performing tasks described herein. This can include, for example, a computer having a central processing unit (CPU) and non-volatile memory that stores software instructions for instructing the CPU to perform at least some of the tasks described herein. This can also include, for example, two or more computers that are in communication via a computer network, where one or more of the computers include a CPU and non-volatile memory, and one or more of the computer's non-volatile memory stores software instructions for instructing any of the CPU(s) to perform any of the tasks described herein. Thus, while the exemplary embodiment is described in terms of a discrete machine, it should be appreciated that this description is non-limiting, and that the present description applies equally to numerous other arrangements involving one or more machines performing tasks distributed in any way among the one or more machines. It should also be appreciated that such machines need not be dedicated to performing tasks described herein, but instead can be multi-purpose machines, for example computer workstations, that are suitable for also performing other tasks.

The I/O interface 242 can provide a communication link between external users, systems, and data sources and components of the system 236. The I/O interface 242 can be configured for allowing one or more users 240 to input information to the system 236 via any known input device. Examples can include vibration sensor system 212, memory 232, a keyboard, mouse, touch screen, and/or any other desired input device. The I/O interface 242 can be configured for allowing one or more users to receive information output from the system 236 via any known output device. Examples can include a display monitor, a printer, and/or any other desired output device. The I/O interface 242 can be configured for allowing other systems to communicate with the system 236. For example, the I/O interface 242 can allow one or more remote computer(s) to access information, input information, and/or remotely instruct the system 236 to perform one or more of the tasks described herein. The I/O interface 242 can be configured for allowing communication with one or more remote data sources.

For example, the I/O interface 242 can allow one or more remote data source(s) to access information, input information, and/or remotely instruct the system 236 to perform one or more of the tasks described herein.

The database 246 provides persistent data storage for system 236. While the term "database" is primarily used, a memory or other suitable data storage arrangement may provide the functionality of the database 246. In alternative embodiments, the database 246 can be integral to or separate from the system 236 and can operate on one or more computers. The database 246 preferably provides non-volatile data storage for any information suitable to support the operation of the system 236, including various types of data discussed further herein.

The analysis engine 244 can be configured for implementing at least one step in method 300. The analysis engine 244 can include various combinations of one or more processors, memories, and software components.

The device, system, and methods described herein can advantageously provide at least one of the following benefits: (1) the capability to collect and record vibrational information about aircraft components and systems during operation; (2) the ability to determine the optimal location for a vibration sensor on a drive train or other rotating system; (3) the capability to determine which component in the drive train is failing; (4) determine when a component in the drive train should be replaced or repaired prior to failure, which can prevent further damage to adjacent components; (5) only requires vibration sensors (and does not use tachometers); and (6) the ability to adjust the operation of the aircraft to lessen the impact of the unhealthy component in the drive train on the safety of the flight and damage to other components in the drive train.

The particular embodiments disclosed above are illustrative only, as the apparatus may be modified and practiced in different but equivalent manners apparent to those skilled in the art having the benefit of teachings herein. Modifications, additions, or omissions may be made to the apparatuses described herein without departing from the scope of the invention. The components of the apparatus may be integrated or separated. Moreover, the operations of the apparatus may be performed by more, fewer, or other components.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The terms "a" and "an" are defined as one or more unless this disclosure explicitly requires otherwise.

Furthermore, no limitations are intended to the details of construction or design herein shown, other than as described in the claims below. It is therefore evident that the particular embodiments disclosed above may be altered or modified and all such variations are considered within the scope and spirit of the application. Accordingly, the protection sought herein is as set forth in the claims below.

What is claimed is:

1. A method of diagnosing an anomaly of a monitored component in a drive train, the method comprising:
   obtaining, by the device configured to diagnose an anomaly, rotational information associated with the component;
   receiving, by a device configured to diagnose an anomaly, original data indicating the toothmesh frequency of the drive train;
   filtering, by the device configured to diagnose an anomaly, the original data to remove energy above the toothmesh frequency;
   interpolating, by the device configured to diagnose an anomaly, the filtered original data to generate an integer number of samples per tooth passage; and
   generating, by the device configured to diagnose an anomaly, an amplified differential coherence (ADC), wherein the step of generating the ADC comprises the following steps:

(i) determining a first intermediary amplified differential coherence (ADCN), wherein the ADCN is the coherence evaluated at a toothmesh frequency between the first T/2 teeth of revolution i and the first T/2 teeth of revolution i+1 of the monitored component, where T is the number of teeth on the monitored component;

(ii) determining a second intermediary amplified differential coherence (ADCS), wherein the ADCS is the coherence evaluated at a toothmesh frequency between the first T/2 teeth of revolution i and the last T/2 teeth of revolution i of the monitored component;

(iii) subtracting the second intermediary amplified differential coherence from the first intermediary amplified differential coherence to generate a third intermediary amplified differential coherence value; and (iv) calculating the ADC using the third intermediary amplified differential coherence value; and tracking the ADC over flight hours to determine a healthy or unhealthy condition of the drive train.

2. The method according to claim 1, wherein the rotational information comprises at least one of a rotating speed of the component and a total number of teeth of the component.

3. The method according to claim 1, further comprising:
determining a healthy or an unhealthy condition of the amplified differential coherence;
if the amplified differential coherence is an unhealthy condition:
identifying an unhealthy component.

4. The method according to claim 3, further comprising:
adjusting at least one of the operation and a maintenance of the monitored component.

5. The method according to claim 1, further comprising:
generating, by the device configured to diagnose an anomaly, an amplified differential coherence gearbox arrangement value (ADCT).

6. The method according to claim 5, further comprising:
determining a healthy or an unhealthy condition of the amplified differential coherence gearbox arrangement value (ADCT);
if the amplified differential coherence is an unhealthy condition:
identifying an unhealthy component.

7. The method according to claim 6, further comprising:
adjusting at least one of the operation and a maintenance of the unhealthy component.

8. The method according to claim 1, wherein the step of calculating the ADC using the third intermediary amplified differential coherence value comprises;
if the third intermediary amplified differential coherence value is less than zero, then set the third intermediary amplified differential coherence value to zero; or
if the third intermediary amplified differential coherence value is equal to zero or less than zero, then do not generate amplified differential coherence.

9. The method according to claim 1, wherein the device configured to diagnose an anomaly further comprises:
a display;
wherein the device provides a real-time indication of an anomaly in the monitored component.

10. The method according to claim 1, further comprising:
storing a history, by the device configured to diagnose an anomaly, of original data;

wherein the history being stored before the diagnostic operation for the component is performed.

11. A device configured to diagnose an anomaly of a monitored component in a drive train, the device comprising a memory configured to store original data indicating a toothmesh frequency of the drive train;
one or more processors in communication with the memory, the one or more processors being configured to:
obtain rotational information associated with the component;
receive the original data indicating a toothmesh frequency;
filter the original data to remove the energy above the toothmesh frequency;
interpolate the filtered original data to generate an integer number of samples per tooth passage; and
generate an amplified differential coherence (ADC), wherein the step of generate the ADC comprises the following steps:

(i) determine a first intermediary amplified differential coherence (ADCN), wherein the ADCN is the coherence evaluated at a toothmesh frequency between the first T/2 teeth of revolution i and the first T/2 teeth of revolution i+1, where T is the number of teeth on the monitored component;

(ii) determine a second intermediary amplified differential coherence (ADCS), wherein the ADCS is the coherence evaluated at a toothmesh frequency between the first T/2 teeth of revolution i and the last T/2 teeth of revolution i of the monitored component;

(iii) subtract the second intermediary amplified differential coherence from the first intermediary amplified differential coherence to generate a third intermediary amplified differential coherence value; and (iv) calculate the ADC using the third intermediary amplified differential coherence value; and track the ADC over flight hours to determine a healthy or unhealthy condition of the drive train.

12. The device according to claim 11, wherein the processors are configured to:
determine a healthy or unhealthy condition of the amplified differential coherence;
if the amplified differential coherence is an unhealthy condition:
identify an unhealthy component.

13. The device according to claim 11, wherein the processors are configured to:
generate an amplified differential coherence gearbox arrangement value (ADCT).

14. The device according to claim 13, wherein the processors are configured to:
determine a healthy or unhealthy condition of the amplified differential coherence gearbox arrangement value (ADCT);
if the amplified differential coherence is an unhealthy condition:
identify an unhealthy component.

15. The device according to claim 11, wherein the device further comprises:
a display;
wherein the device provides a real-time indication of an anomaly in the monitored component.

16. The device according to claim 11, wherein the original data is stored before the diagnostic operation for the component is performed.

17. A system for diagnosing an anomaly of a monitored component in a drive train, the system comprising:
- a rotorcraft comprising a body, a power train coupled to the body and comprising a power source and a drive train coupled to the power source;
- a vibration sensor system coupled to the drive train; and
- a diagnostic device associated with the vibration sensor system, the diagnostic device operable to:
  - obtain rotational information associated with the component;
  - receive original data indicating a toothmesh frequency of the drive train;
  - filter the original data to remove the energy above the toothmesh frequency;
  - interpolate the filtered original data to generate an integer number of samples per tooth passage; and
  - generate an amplified differential coherence (ADC), wherein the step of generate the ADC comprises the following steps:
    - (i) determine a first intermediary amplified differential coherence (ADCN), wherein the ADCN is the coherence evaluated at a toothmesh frequency between the first T/2 teeth of revolution i and the first T/2 teeth of revolution i+1, where T is the number of teeth on the monitored component;
    - (ii) determine a second intermediary amplified differential coherence (ADCS), wherein the ADCS is the coherence evaluated at a toothmesh frequency between the first T/2 teeth of revolution i and the last T/2 teeth of revolution i of the monitored component;
    - (iii) subtract the second intermediary amplified differential coherence from the first intermediary amplified differential coherence to generate a third intermediary amplified differential coherence value; and
    - (iv) calculate the ADC using the third intermediary amplified differential coherence value; and
  - track the ADC over flight hours to determine a healthy or unhealthy condition of the drive train.

18. The system according to claim 17, wherein the diagnostic system is further operable to generate an amplified differential coherence gearbox arrangement value (ADCT).

19. The system according to claim 17, wherein the vibration sensor system comprises at least one accelerometer.

20. A non-transitory computer-readable storage medium encoded with instructions that, when executed, cause one or more processors of a computing device to diagnose an anomaly of a monitored component in a drive train to:
- obtain rotational information associated with the component;
- receive original data indicating a toothmesh frequency of the drive train;
- filter the original data to remove the energy above the toothmesh frequency;
- interpolate the filtered original data to generate an integer number of samples per tooth passage; and
- generate an amplified differential coherence (ADC), wherein the step of generate the ADC comprises the following steps:
  - (i) determine a first intermediary amplified differential coherence (ADCN), wherein the ADCN is the coherence evaluated at a toothmesh frequency between the first T/2 teeth of revolution i and the first T/2 teeth of revolution i+1, where T is the number of teeth on the monitored component;
  - (ii) determine a second intermediary amplified differential coherence (ADCS), wherein the ADCS is the coherence evaluated at a toothmesh frequency between the first T/2 teeth of revolution i and the last T/2 teeth of revolution i of the monitored component;
  - (iii) subtract the second intermediary amplified differential coherence from the first intermediary amplified differential coherence to generate a third intermediary amplified differential coherence value; and
  - (iv) calculate the ADC using the third intermediary amplified differential coherence value; and
- track the ADC over flight hours to determine a healthy or unhealthy condition of the drive train.

* * * * *